J. F. Brewer,

Chain.

No. 89,282.   Patented Apr. 27, 1869.

Witnesses:
R. B. Lewis
C. A. Shepard

Inventor:
James F. Brewer
By James Shepard Atty.

United States Patent Office.

JAMES F. BREWER, OF PLANTSVILLE, CONNECTICUT.

Letters Patent No. 89,282, dated April 27, 1869.

IMPROVEMENT IN CHAINS.

The Schedule referred to in these Letters Patent and making part of the same.

*To all whom it may concern:*

Be it known that I, JAMES F. BREWER, of Plantsville, in the county of Hartford, and State of Connecticut, have invented a new and useful Improvement in Chains; and I do hereby declare that the following is a full, clear, and exact description thereof, which will enable those skilled in the art to make and use the same, reference being had to the accompanying drawings, making a part of this specification, in which—

Figure 1:
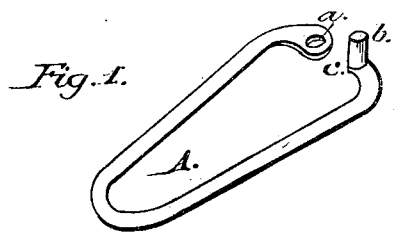
Figure 2:
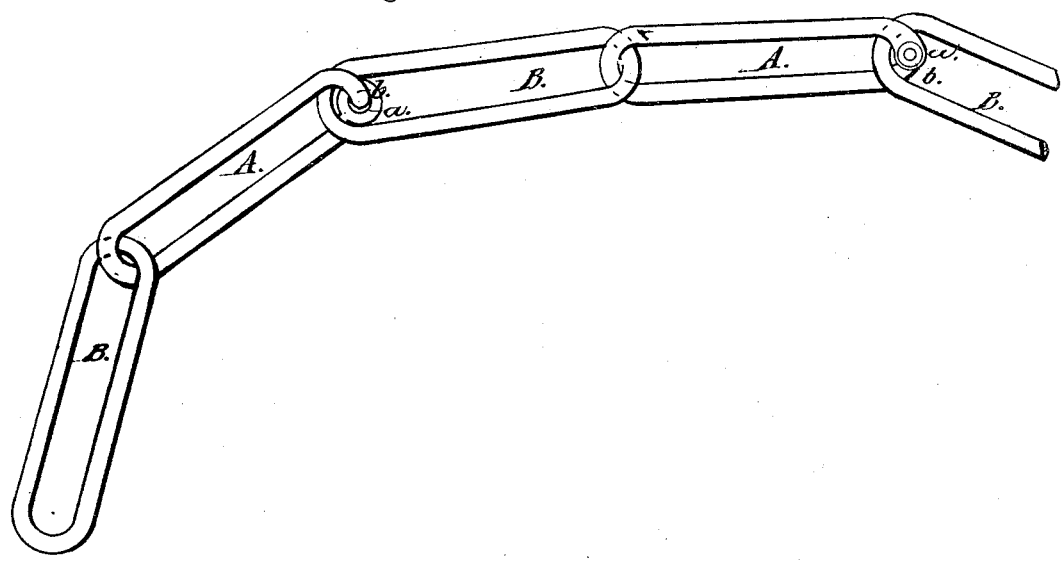

Figure 1 is a perspective view of my invention.
Figure 2 is a view of several links connected.
Similar letters of reference indicate like parts.

My invention consists in the use or employment of an eye and pin, cast on an open chain-link, in such manner that the pin can be inserted in the eye by springing the link and then upset.

*a* designates the eye or socket, and
*b* designates the pin or tenon.

The link A is cast open, as shown in fig. 1, and, if desired, a chain can be made wholly from such links, but it is designed to be used as an alternate link to connect the solid link B, which is slipped on the link A, through the opening *c*, fig. 1.

The sides of the link A are then sprung together, until the eye *a* and pin *b* meet, when the pin *b* is inserted in eye *a*, and its end upset or riveted, when the link is firmly connected.

Other links are attached in like manner, until the chain is of the length desired.

The links can be of any desired shape, and the eye *a* and pin *b* can be placed in any position on the link that will allow them to be sprung together.

My invention is principally designed for chains for animal-traps, which chains are generally made of alternate links of welded wrought-iron, and malleable cast-iron.

By my invention, I produce a chain wholly of cast-metal, and connected by little labor, thereby producing a chain at a very small cost.

What I claim as new, and desire to secure by Letters Patent, is—

1. The cast-metal link A, with its eye *a* and pin *b*, all arranged substantially as shown and described, and for the purposes set forth.

2. As a new article of manufacture, a chain, the alternate links of which are connected by means of the eye *a* and pin *b* of a cast-metal link, all as and for the purpose substantially as required.

JAMES F. BREWER.

Witnesses:
   E. B. HOLCOMB,
   CHAUNCY WOODING